(12) United States Patent
Nordlin

(10) Patent No.: US 8,770,898 B2
(45) Date of Patent: Jul. 8, 2014

(54) TAIL PIECE FOR AN EXTENDABLE DRILL BIT ASSEMBLY HAVING A REDUCED HEAD

(75) Inventor: William Nordlin, Poplar Grove, IL (US)

(73) Assignee: Greenlee Textron Inc., Rockford, IL (US)

( * ) Notice: Subject to any disclaimer, the term of this patent is extended or adjusted under 35 U.S.C. 154(b) by 321 days.

(21) Appl. No.: 13/100,355

(22) Filed: May 4, 2011

(65) Prior Publication Data

US 2011/0280676 A1 Nov. 17, 2011

Related U.S. Application Data

(60) Provisional application No. 61/334,357, filed on May 13, 2010.

(51) Int. Cl.
   *B23B 39/10* (2006.01)
   *B23B 31/08* (2006.01)

(52) U.S. Cl.
   CPC .................................... *B23B 31/08* (2013.01)
   USPC ...................................... 408/127; 408/239 A

(58) Field of Classification Search
   USPC ......... 408/127, 238, 239 A, 239 R, 240, 226; 279/74, 75, 82, 143, 145
   See application file for complete search history.

(56) References Cited

U.S. PATENT DOCUMENTS

| | | | |
|---|---|---|---|
| 2,357,773 A | 9/1944 | Sheskier | |
| 2,487,203 A | 11/1949 | Wilber | |
| 2,496,412 A | 2/1950 | Scheppe | |
| 2,567,994 A | 9/1951 | Downs | |
| 2,747,384 A | 5/1956 | Beam | |
| 2,816,769 A | 12/1957 | Noble | |
| 2,958,349 A | 11/1960 | McNutt | |
| 3,006,223 A | 10/1961 | Broussard | |
| 3,016,073 A | 1/1962 | Broussard et al. | |
| 3,251,605 A | 5/1966 | Ondeck | |
| 3,735,993 A | 5/1973 | Seibert | |
| 4,076,444 A | 2/1978 | Siebrecht | |
| 4,378,057 A | 3/1983 | O'Connell | |
| 4,850,758 A | 7/1989 | Morgan | |
| 4,990,038 A | 2/1991 | DeLong | |
| 5,062,749 A * | 11/1991 | Sheets | 279/75 |
| 5,167,476 A | 12/1992 | Lafferty et al. | |
| 5,417,527 A * | 5/1995 | Wienhold | 408/239 R |
| 5,505,570 A * | 4/1996 | Meyen | 408/58 |
| 5,597,275 A | 1/1997 | Hogan | |
| 5,915,893 A | 6/1999 | Miyanaga | |
| 5,957,634 A | 9/1999 | Carpinetti | |

(Continued)

*Primary Examiner* — Andrea Wellington
*Assistant Examiner* — Alan Snyder
(74) *Attorney, Agent, or Firm* — Klintworth & Rozenblat IP LLC

(57) ABSTRACT

An assembly includes a quick-release head, a tail piece and a flexible metal rod. The tail piece includes a shaft and a male coupler formed of a head, body, and flute. At least a portion of the male coupler head has a reduced outer dimension relative to an outer dimension of the body. When the male coupler is mounted in a second quick-release head or drill, a clearance space is provided between the reduced outer dimension portion and the second quick-release head or drill. During use, the assembly may undergo bending which results in significant forces applied in particular to the male coupler head. By providing the clearance space, these forces are predominantly shifted to the male coupler body, thereby reducing the likelihood that the male coupler head will shear from the remainder of the male coupler.

14 Claims, 5 Drawing Sheets

(56) References Cited

U.S. PATENT DOCUMENTS

| | | | |
|---|---|---|---|
| 6,135,462 A * | 10/2000 | Robison | 279/137 |
| 6,199,872 B1 | 3/2001 | Hasan | |
| 6,241,434 B1 | 6/2001 | Ajimi | |
| 6,260,701 B1 | 7/2001 | Katayama et al. | |
| 6,270,085 B1 * | 8/2001 | Chen et al. | 279/22 |
| 6,302,408 B1 * | 10/2001 | Zierpka | 279/75 |
| 6,311,989 B1 | 11/2001 | Rosanwo | |
| 6,511,266 B1 | 1/2003 | Groot | |
| 6,511,268 B1 | 1/2003 | Vasudeva et al. | |
| 6,561,523 B1 | 5/2003 | Wienhold | |
| 6,572,311 B2 | 6/2003 | Vasudeva | |
| 6,808,182 B2 * | 10/2004 | Lin | 279/74 |
| 6,902,358 B2 * | 6/2005 | Thomas | 408/226 |
| 7,435,042 B2 | 10/2008 | White et al. | |
| 2004/0081523 A1 * | 4/2004 | Vasudeva et al. | 408/240 |
| 2005/0232715 A1 * | 10/2005 | Baumann et al. | 408/226 |
| 2007/0053754 A1 * | 3/2007 | Hartranft et al. | 408/127 |
| 2007/0206996 A1 | 9/2007 | Bharadwaj et al. | |
| 2007/0264093 A1 | 11/2007 | White et al. | |
| 2008/0317559 A1 | 12/2008 | White et al. | |

* cited by examiner

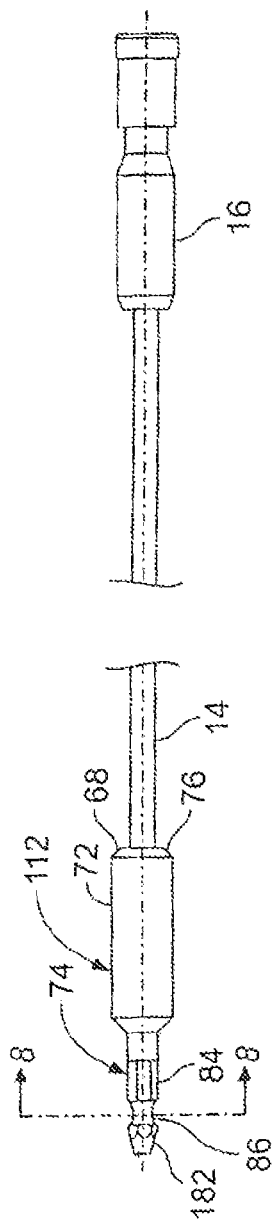
FIG. 6
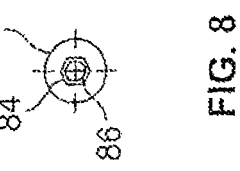
FIG. 8
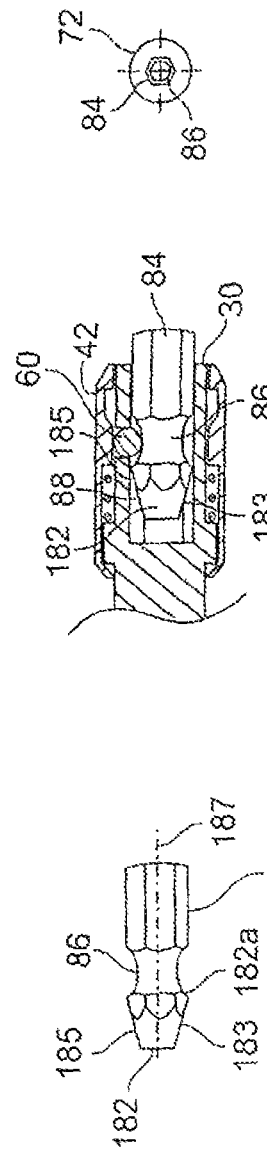
FIG. 7a
FIG. 7

TAIL PIECE FOR AN EXTENDABLE DRILL BIT ASSEMBLY HAVING A REDUCED HEAD

This application claims the benefit of U.S. provisional application Ser. No. 61/334,357 filed on May 13, 2010, the disclosure of which is herein incorporated by reference in its entirety.

FIELD OF THE INVENTION

This invention is generally directed to a tail piece for an extendable drill bit assembly.

BACKGROUND OF THE INVENTION

Extendable drill bit assemblies provide for use of a drill at an extended distance from the location to be drilled. These extendable drill bit assemblies include flexible rods. Alignment of the drill bit with the location to be drilled often results in a bend in the flexible rods allowing the operator to access locations for drilling which may otherwise be inaccessible to the operator. Rotational forces are transferred from the chuck of the drill to the drill bit including along the bend path. As a result of the bend in the path, forces occur between the head of the shank of the tail piece and the chuck of the drill and, at times, results in the head of the shank of the tail piece being sheared from the remainder of the tail piece.

U.S. Pat. No. 4,990,038 to DeLong discloses a drill bit which is received by a collet attached to the distal end of a flexible drive cable. The drill bit includes a boss at the proximal end thereof which aids in retaining the drill bit within the collet as the drill bit is removed from the material being drilled. The boss includes a stem and a head. In DeLong, the drill bit is assembled into the collet by sliding the drill bit drive end into the collet and radially manipulating until the boss head passes through an opening in a wall of the collet. Thereafter, the drill bit is rotated until the boss head is locked behind the wall. When locked in this manner, the drill bit cannot be removed by mere application of an axial withdrawal force. Also, rotation of the drill bit in the collet is restricted in angular extent by the wall so that the drill bit can be removed by merely rotating. In DeLong, although the dimension of the boss is reduced relative to the dimension of the shaft of the drill bit, due to the offset of the boss, no clearance is provided between an outer surface of the boss head and the inner surface of the wall of the collet. Thus, upon the application of rotational forces and upon flexing of the drive shaft, the boss will be subjected to forces which may cause the boss to shear. In addition, the boss is not required to retain the locking ball of a quick-change locking system in a locked position.

U.S. Pat. No. 5,167,476 to Lafferty et al. discloses a drill bit, which includes an eccentric extension. The eccentric extension is provided at the proximal end of the drill bit and matches in size and shape a recess of the collet. The drill bit is locked in rotational engagement with the collet by the eccentric extension engaging the recess. With the extension in the recess, there us no slippage of the drill bit in the collet. Although the eccentric extension is reduced in diameter relative to the shaft of the drill bit, the extension is offset. Thus, when positioned within the collet, the outer surface of the extension will abut the inner surface of the collet. Because no clearance is provided, upon rotation and flexing of the shaft, the forces applied to the extension may cause the extension to shear. In addition, the extension does not serve to retain a locking ball of a quick-change locking mechanism in the locked position.

U.S. Pat. No. 5,597,275 to Hogan discloses an adapter mounted to a drill. The adaptor includes a forward extending shaft which is cut away to form a tongue and a groove. The drill bit to be mounted to the drill also includes a tongue and groove which is designed to mate with the tongue and groove of the shaft. With this engagement, rotation of shaft is transmitted to the drill bit so that the two will rotate together and working tip (drill bit) is held against axial movement, i.e., movement forwardly or rearwardly with respect to shaft. Another embodiment in Hogan provides a shaft having an engagement end including a half round end portion which mates with a half round end portion of a drill bit. None of the embodiments disclosed in Hogan include a quick-change mechanism with a locking ball to be held in a locked position. In addition, none of the embodiments disclosed in Hogan include a tail piece having a reduced dimension which provide clearance between the outer surface of a proximal end of the tail piece and the quick change mechanism which receives the tail piece.

U.S. Pat. No. 4,850,758 to Morgan discloses a quick-change drill bit including a drill bit holder which receives a drill bit. The shaft of the drill bit is hexagonal in shape about 5/16" across flats. This increased size prevents these drill bits from being used in currently manufactured holders without the safety provided by the split sleeves provided in Morgan. The increased size also overcomes the loss of strength caused by the circular groove. About ½" of drill bit shaft fits into the holder, the inside of which is also hexagonal in shape and sized to fit the approximate 5/16" size of the drill bit shaft. The drill bit shaft has a circular groove cut only into the high points of the hex-shape to engage a "C" ring inside the holder. The drill bit shaft has a circular groove to provide shoulders for the split sleeve ends to hold against. Although Morgan contemplates that the shaft of the drill bit will have a radial dimension smaller than the radial dimension of the working end of the drill bit, Morgan does not disclose a proximal end of a shaft having radial dimensions smaller than the inner dimension of the holder to provide clearance between the holder and the proximal end of the shaft. Rather, Morgan discusses increasing the radial dimensions at the proximal end of the shaft to avoid use in "currently manufactured" holders.

The prior art shows drill bits having drive shaft portions which are received by the chuck of the drill or an adaptor. The prior art also shows that the drive shaft portion may include a reduced dimensioned section, however, the reduced dimension sections of these drive shafts are not configured to provide clearance between the reduced dimension section and the chuck of the drill or the interior surface of the adaptor in which it is received. In addition, the prior art which provides for drive shafts having reduced dimensions are not configured to retain a locking mechanism of a quick-change assembly.

The present invention provides an improved tail piece for use in an extendable drill bit assembly which overcomes the problems presented in the prior art and which provides additional advantages over the prior art, such advantages will become clear upon a reading of the attached specification in combination with a study of the drawings.

SUMMARY OF THE INVENTION

A drill bit assembly includes a quick-release head, a tail piece and a flexible metal rod connected to the quick-release head and to the tail piece. The tail piece includes a shaft and a male coupler provided at an end of the shaft. The male coupler is formed of a head, a body, and a flute extending therebetween. The head has at least a portion thereof which has a reduced outer dimension relative to an outer dimension of the body. When the male coupler is mounted in a quick-release drill or in a second quick-release head, a clearance space is provided between the reduced outer dimension portion of the head of the male coupler and the quick-release drill or the second quick-release head. During use, the drill bit assembly may undergo bending which results in significant forces applied to the male coupler of the tail piece and in particular to the head of the male coupler. By reducing the outer dimension of the head of the male coupler to provide the clearance space, these forces are predominantly shifted to the body of the male coupler, thereby reducing the likelihood that the head will shear from the remainder of the male coupler.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 6 is an elevational view of an alternative embodiment of the improved tail piece;

FIG. 7 is an enlarged elevational view of a portion of the improved tail piece of FIG. 6;

FIG. 7A shows the improved tail piece seated in another component;

FIG. 8 is a cross-sectional view of the improved tail piece of FIG. 6 taken along line 8-8.

DETAILED DESCRIPTION OF THE ILLUSTRATED EMBODIMENT

Figure 1:
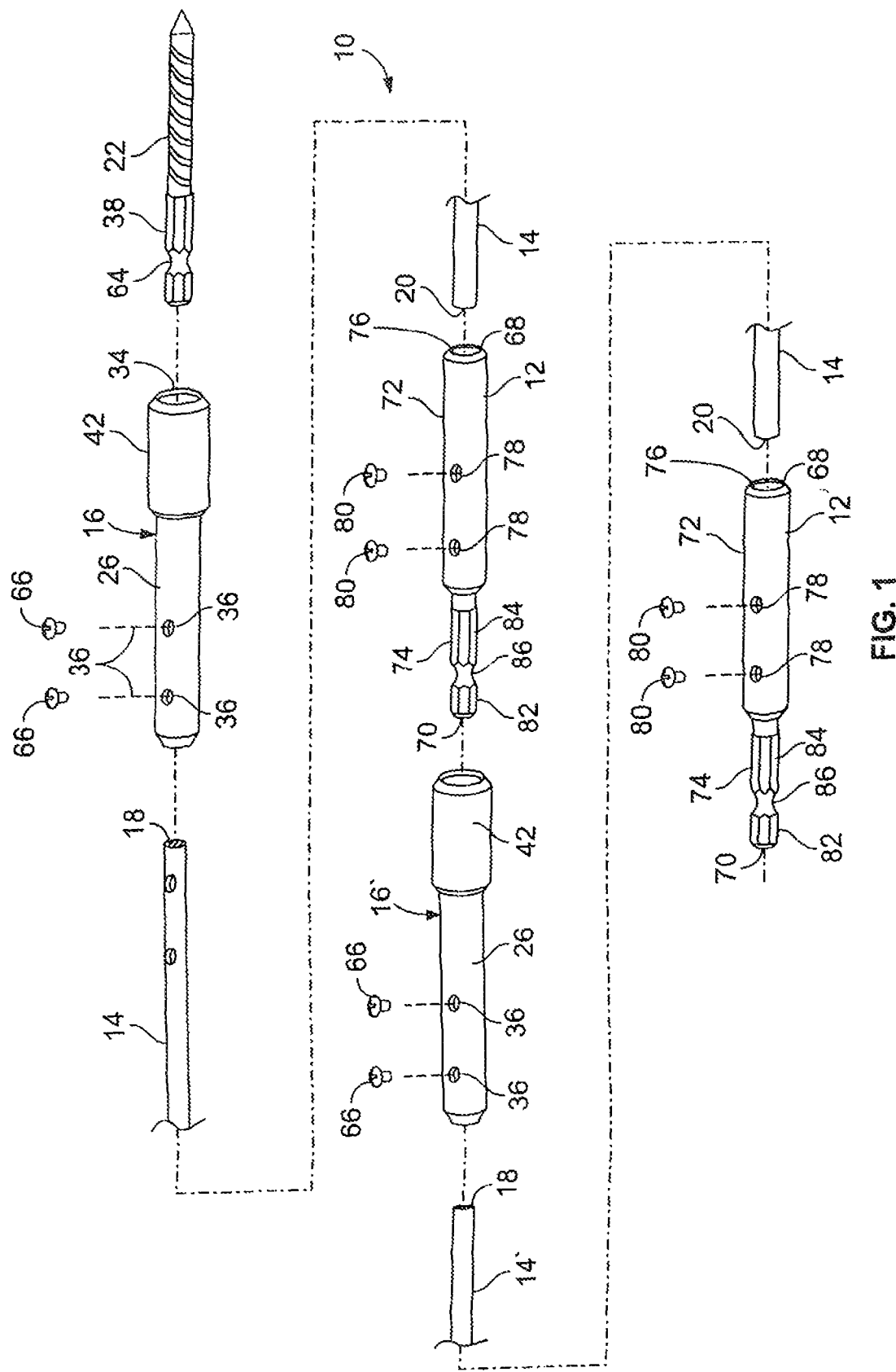
FIG. 1 is an exploded perspective view of a drill bit assembly which includes the improved tail piece which incorporates the features of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

An extendable drill bit assembly 10 in which a tail piece 12 which incorporates the features of the present invention is shown in FIG. 1. The drill bit assembly 10 includes a first quick-release head 16, a first flexible metal rod 14, the tail piece 12, a second quick-release head 16', a second flexible metal rod 14', and a second tail piece 12'. The distal end of the drill bit assembly 10 receives a drill bit 22 and a proximal end of the drill bit assembly 10 is received by a quick-release chuck 23 of a drill 24. The first quick-release head 16 is integrally formed at or attached to a distal end 18 of the rod 14 and the first tail piece 12 is integrally formed at or attached to a proximal end 20 of the rod 14. The second quick-release head 16' is integrally formed at or attached to a distal end of the second rod 14' and the second tail piece 12' is integrally formed at or attached to a proximal end 20' of the second rod 14'. The first quick-release head 16 receives the drill bit 22 and the second quick-release head 16' receives the tail piece 12. The second tail piece 12' is received by the drill 24. The second rod 14' may be identical in length to the first rod 14, or may have a different length than the first rod 14.

Figure 3:
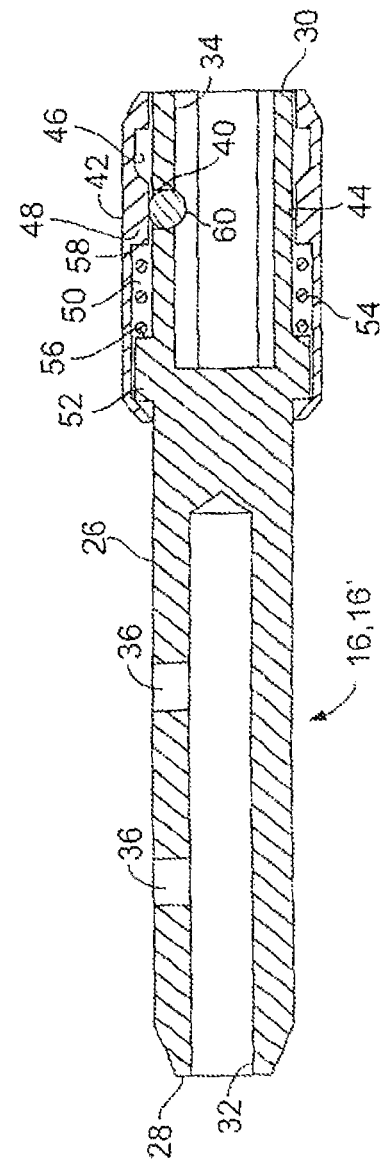
FIG. 3 is a cross-sectional view of a prior art quick-release head which is used in FIG. 1.

An example of the quick-release head 16 is shown in FIG. 3, however, it is to be understood that the quick-release head 16 may be formed in a variety of configurations/take other shapes as is known in the prior art. The quick-release head 16 is formed from metal and includes a shaft 26 having a proximal end 28 and a distal end 30. An axially extending rod bore 32 is provided at the proximal end 28 and extends a predetermined distance along the shaft 26. The rod bore 32 receives the distal end of the rod 14. An axially extending bit bore 34 is provided at the distal end 30 and extends a predetermined distance along the shaft 26. The bit bore 34 receives the drill bit 22. The rod bore 32 has a circular cross-section. Set screw apertures 36 extend radially through the shaft 26 and communicate with the rod bore 32. The bit bore 34 has a hexagonal cross-section for receiving the bit 22 which has a hexagonally-shaped shank profile 38 (see FIG. 1). A ball aperture 40 is provided through the shaft 26 and is in communication with the bit bore 34. A sleeve 42 is positioned over a distal portion of the quick-release head 16 proximate the bit bore 34. An inner surface 44 of the sleeve 42 defines a ball recess 46, a ball locking protrusion 48, and a spring recess 50. A shoulder 52 extends outwardly from the shaft 26 proximate the bit bore 34. The sleeve 42 extends from the distal end 30 of the quick-release head 16 to a location rearward of the shoulder 52. A spring 54 is positioned between a distal wall 56 of the shoulder 52 and a proximal wall 58 of the ball locking protrusion 48 to bias the sleeve 42 in a distal position relative to the shaft 26 as shown in FIG. 3. A ball 60 is positioned within the ball aperture 40 and moves in a radial direction. In the distal or locked position, the ball locking protrusion 48 forces the ball 60 radially inward to engage a flute 64 (see FIG. 1) of the drill bit 22 to prevent the drill bit 22 from exiting the bit bore 34 of the quick-release head 16. When a user desires to release the drill bit 22 from the quick-release head 16, the user pulls the sleeve 42 proximally to slide the sleeve 42 along the shaft 26 and compress the spring 54. When the ball recess 46 of the sleeve 42 is aligned with the ball 60, the ball 60 will move radially outward from the flute 64, thereby allowing the drill bit 22 to be removed from the bit bore 34. Set screws 66 seat within the set screw apertures 36 to secure the distal end 18 of the rod 14 to the quick-release head 16 in a known manner.

The tail piece 12 is formed from metal and, as shown in FIG. 1, includes a distal end 68 and a proximal end 70. A shaft portion 72 is provided at the distal end and a male coupler portion 74 is provided at the proximal end. An axially extending rod bore 76 is provided at the distal end 68 and extends a predetermined distance along the shaft portion 72. The rod bore 76 receives the proximal end 20 of the rod 14. Set screw apertures 78 extend radially through the shaft portion 72 and are in communication with the rod bore 76. Set screws 80 seat within the set screw apertures 78 to secure the proximal end 20 of the rod 14 within the rod bore 76 in a known manner.

Figure 2A:
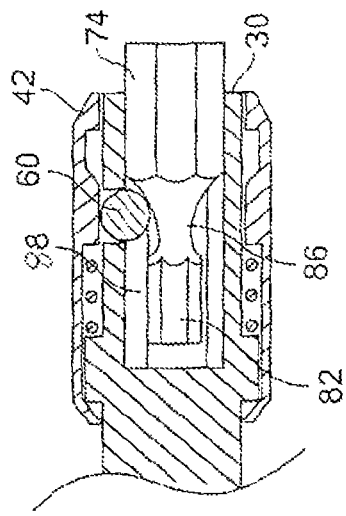
FIG. 2A shows the improved tail piece seated in another component.
Figure 2:
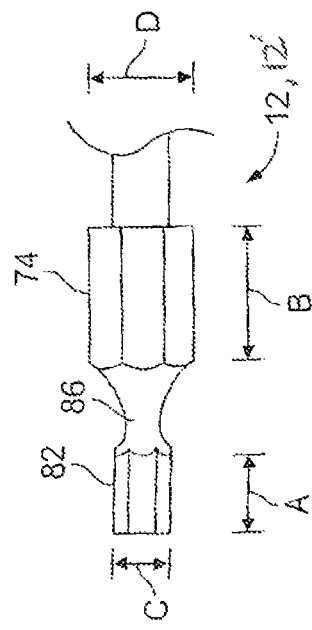
FIG. 2 is an enlarged view of a portion of the improved tail piece.

The male coupler portion 74 includes a head 82, a body 84, and a flute 86 extending between the head 82 and the body 84. The cross-section of the head 82 and the body 84 are hexagonal and the cross-section of the flute 86 is circular. As illustrated in FIG. 2, the head 82 of the male coupler portion 74 has a length (shown by dimension A) that is shorter than the length of the body 84 of the male coupler portion 74 (shown in by dimension B). In addition, the head 82 of the male coupler portion 74 has a reduced outer dimension (shown by dimension C) relative to the outer dimension of the body 84 of the male coupler portion 74 (shown by dimension D).

The second quick-release head 16' is identical in construction to the first quick-release head 16 and therefore the same reference numerals are used to show the elements of the second quick-release head 16'. The bit bore 34 of the second quick-release head 16' receives the male coupler portion 74, including the head 82, the body 84 and the flute 86, of the first tail piece 12. The ball 60 (see FIG. 2) of the second quick-release head 16' is received by the flute 86 of the male coupler portion 74 of the first tail piece 12 to lock the first tail piece 12 to the second quick-release head 16'. The rod bore 32 of the second quick-release head 16' receives the distal end 18 of the second rod 14'.

The second tail piece 12' is identical in construction to the first tail piece 12. The proximal end 20 of the second rod 14' is received by the rod bore 68 of the second tail piece 12' and secured thereto by set screws 80. The male coupler portion 74, including the head 82, the body 84 and the flute 86, of the second tail piece 12' is received by the quick-release chuck 23 of the drill 24. As with the quick-release heads 16, 16', when used within the drill 24 having the quick-release chuck 23, a ball is positioned and held within the flute 86 of the tail piece 12 to lock the tail piece 12 within the chuck 23 of the drill 24.

The male coupler 74 of the first tail piece 12 seats within the bit bore 34 of the second quick-release head 16'. The body 84 of the male coupler portion 74 engages with the inner wall of the shaft 26 which forms the bit bore 34. Since the head 82 of the male coupler portion 74 has a reduced outer dimension relative to the outer dimension of the body 84 of the male coupler portion 74, a clearance space 88 is provided between an inner surface of the shaft 26 and the head 82 of the male coupler portion 74. The male coupler 74 of the second tail piece 12' seats within the drill chuck bore of the quick-release drill chuck 23. The body 84 of the male coupler portion 74 engages with the wall which forms the drill chuck bore. Since the head 82 of the male coupler portion 74 has a reduced outer dimension relative to the outer dimension of the body 84 of the male coupler portion 74, a clearance space 88 is provided between an inner surface of the wall of the drill chuck 23 which forms the drill chuck bore and the head 82 of the male coupler portion 74. When assembled with the drill 24, the drill bit assembly 10 allows an operator to drill a hole at an extended distance from the drill 24, and in locations which may otherwise be inaccessible with a typical drill bit. The hexagonal profile of the body 84 of the male coupler portion 74 provides for the transfer of drive forces from the drill 24 to the tail piece 12' and ultimately to the drill bit 22. In use, the drill bit assembly 10 is often bent in order to provide the drill bit 22 at the desired location. The bending of the drill bit assembly 10 results in significant forces applied to the male coupler portion 74 of the tail pieces 12, 12' and in particular to the heads 82 of the male coupler portions 74. By reducing the outer dimensions of the heads 82 of the male coupler portions 74 to provide the clearance spaces 88, these forces are predominantly shifted to the body 84 of the respective male coupler portions 74, thereby reducing the likelihood that the heads 82 will shear from the remainder of the respective shanks 74.

Figure 4:
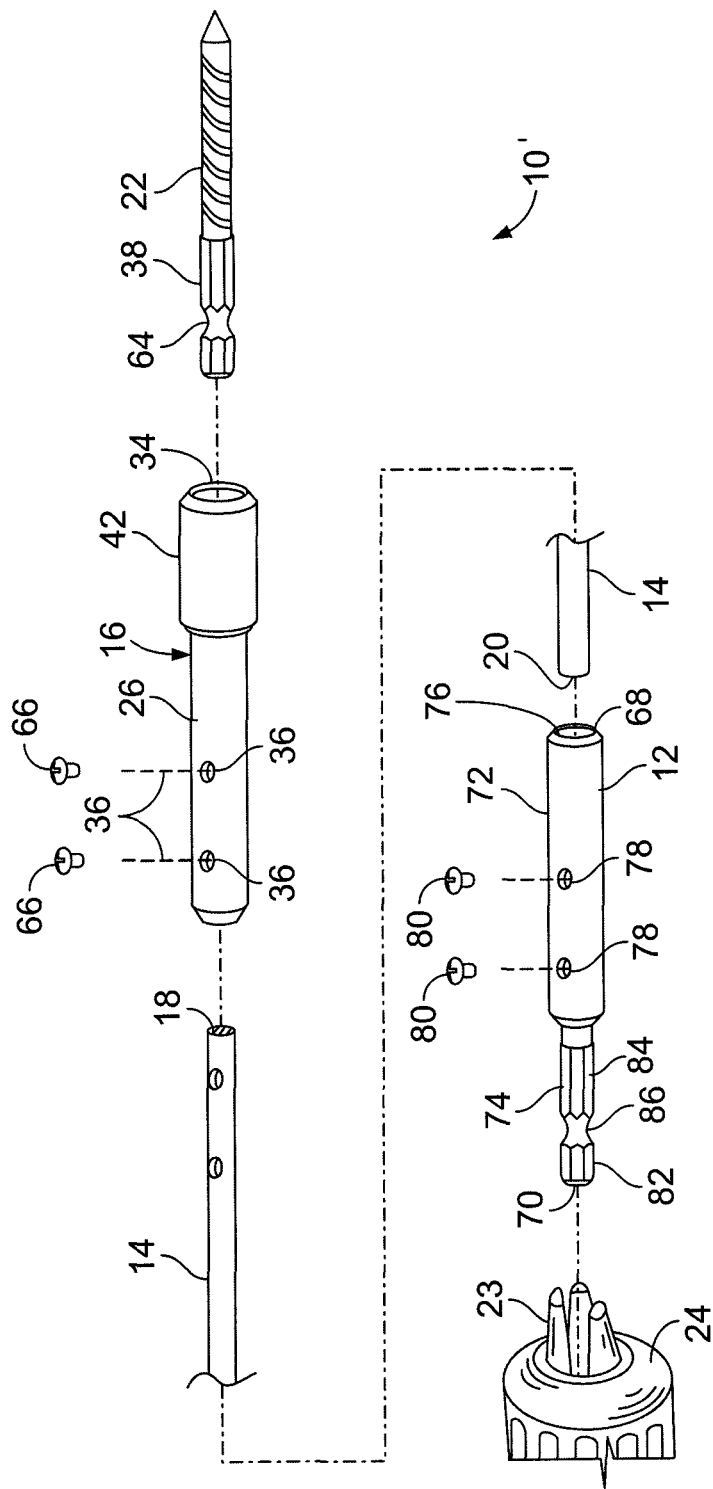
FIG. 4 is an exploded perspective view of an alternative drill bit assembly which includes the improved tail piece.
Figure 5:
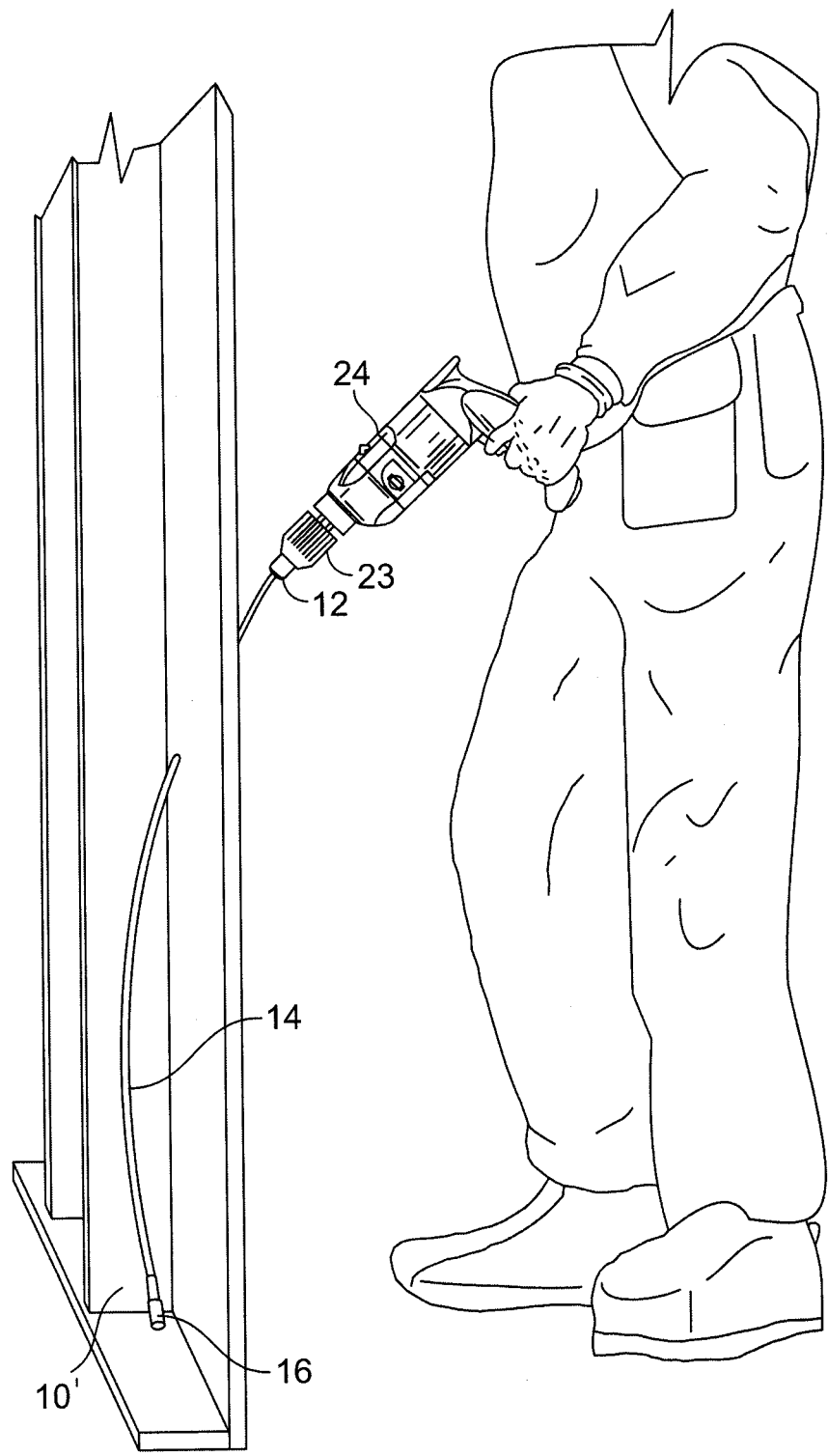
FIG. 5 is a perspective view of an extendible drill bit assembly which incorporates features of the present invention in use.

An alternate extendible drill bit assembly 10' which utilizes the tail piece 12 of the present invention is illustrated in FIG. 4. This assembly 10' eliminates the second tail piece 12' and the second quick-release head 16'. The drill bit assembly 10' generally includes the flexible metal rod 14 having the tail piece 12 integrally formed at or attached to a proximal end 20 of the rod 14, and the quick-release head 16 integrally formed at or attached to the distal end 18 of the rod 14. A distal end of the drill bit assembly 10' receives the drill bit 22 and a proximal end of the drill bit assembly 10' is received by the chuck 23 of the drill 24. As with the quick-release head 16' described above, when used within the drill 24 having a quick-release chuck 23, a ball is positioned and held within the flute 86 of the tail piece 12 to lock the tail piece 12 within the chuck 23 of the drill 24. The hexagonal profile of the body 84 of the male coupler portion 74 provides for the transfer of drive forces from the drill 24 to the tail piece 12 and ultimately to the drill bit 22.

As illustrated in FIGS. 1 and 4, in some instances, the male coupler portion 74 of the tail piece 12 is received by a quick-release head 16' which provides for easy engagement of the tail piece 12 with the quick-release head 16' or easy removal of the tail piece 12 from the quick-release head 16'. In other instances the male coupler portion 74 of the tail piece 12 is received by the chuck 23 of the drill 24 which provides for each engagement of the tail piece 12 with the chuck 23 of the drill 24 or easy removal of the tail piece 12 from the chuck 23 of the drill 24. The ability of the tail piece 12 to be received by the quick-release head 12 or by the chuck of the drill 24 allows for the length of the drill bit assembly to be easily adapted. In the assembly 10 of FIG. 1 for example, the male coupler portion 74 of a first tail piece 12 is received by a second quick-release head 16' and the male coupler portion 74 of a second tail piece 12' is received by the chuck 23 of the drill 24 to provide a longer assembly than that illustrated in FIG. 4.

An alternative head 182 which can be used in place of head 82 in tail piece 12, 12' is shown in FIG. 6. Head 182 is tapered such that at the distal end 182a of the head 182, the outer dimension is equivalent to the outer dimension of the body 84, but a surface 183 of the head 182 tapers to provide a reduced outer dimension relative to the body 84. As best shown in FIG. 7, the distal portion 182a of the head 182 has an outer dimension equivalent to the outer dimension of the body 84. The head 182 further includes a tapered portion 185. The tapered portion 185 is formed of a generally frusto-conically-shaped wall 183 and the wall 183 is angled approximately fifteen degrees (15°) relative to the rotational axis 187 of the tail piece 112. As with the previous embodiment, since the head 182 of the male coupler portion 74 has a reduced outer dimension relative to the outer dimension of the body 84 of the male coupler portion 74, a clearance space 88 is provided between an inner surface of the shaft 26 and the head 82 of the male coupler portion 74 or between an inner surface of the wall of the drill chuck 23 which forms the drill chuck bore and the head 82 of the male coupler portion 74. This frusto-conically-shaped head 182 can be provided using a grinding process to remove a portion of a hexagonally cross-sectioned head. The bending of the drill bit assembly 10, 10' results in significant forces applied to the male coupler portion 74 of the tail pieces 12, 12' and in particular to the heads 182 of the male coupler portions 74. By reducing the outer dimensions of the head 182 of the male coupler portion 74 to provide the clearance space 88, these forces are predominantly shifted to the body 84 of the male coupler portion 74, thereby reducing the likelihood that the head 182 of the male coupler portion 74 will shear from the remainder of the male coupler portion 74.

While preferred embodiments of the present invention are shown and described, it is envisioned that those skilled in the art may devise various modifications of the present invention without departing from the spirit and scope of the appended claims.

The invention claimed is:

1. An assembly comprising:
a quick-release head having a wall defining a bore and a ball engaged with said wall and moveable relative thereto;
a tail piece including a shaft portion, a male coupler portion provided at an end of said shaft portion, said male coupler portion including a head having a proximal end, a distal end and a length defined between said proximal end and said distal end, said head of said tail piece defining an outer dimension, a body having a proximal end and a distal end and a length defined between said proximal end of said body and said distal end of said body, said body defining an outer dimension, and a flute extending between said distal end of said head of said tail piece and said proximal end of said body, the head of said tail piece having a reduced outer dimension relative to said outer dimension of said body, the reduced outer dimension extends 360° around said head of said tail piece and is constant along the entire length of said head of said tail piece; and
a flexible rod connected to said tail piece;
wherein when said tail piece is seated within said bore of said quick-release head and said ball of said quick-release head is seated within said flute of said tail piece to prevent release of the tail piece from said quick-release head, a clearance space is provided between said head of said tail piece and said wall of said quick-release head along the entire length of said head of said tail piece, such that transfer of drive forces from an associated drill are predominantly shifted to the body.

2. The assembly defined in claim 1, wherein said rod is formed of metal.

3. The assembly defined in claim 1, further including a second quick-release head and said rod is attached to said second quick-release head by fasteners and said rod is attached to said tail piece by fasteners.

4. The assembly defined in claim 1, wherein said body and said head of said tail piece are hexagonally-shaped and said flute of said tail piece is circularly-shaped.

5. The assembly defined in claim 1, wherein said length of said head of said tail piece is less than said length of said body of said tail piece.

6. The assembly defined in claim 1, further including a drill bit mounted to said first-defined quick-release head and a drill mounted to said tail piece.

7. The assembly defined in claim 1, wherein a clearance space is provided between said proximal end of said head of said tail piece and said wall of said quick-release head.

8. An assembly comprising:
a quick-release head having a wall defining a bore and a ball engaged with said wall and moveable relative thereto;
a tail piece including a shaft portion, a male coupler portion provided at an end of said shaft portion, said male coupler portion including a head having a proximal end, a distal end and a length defined therebetween, said head of said tail piece defining an outer circumference, a body having a proximal end and a distal end, and a flute extending between said distal end of said head of said tail piece and said proximal end of said body, the head of said tail piece tapering from the distal end thereof to the proximal end thereof, the taper extending 360° around the circumference of said head of said tail piece; and
a flexible rod connected to said tail piece;
wherein when said tail piece is seated within said bore of said quick-release head and said ball of said quick-release head is seated within said flute of said tail piece to prevent release of the tail piece from said quick-release head, a clearance space is provided along substantially the entire length of said head of said tail piece between said head of said tail piece and said wall of said quick-release head, said clearance space continuously extending from said proximal end of said head of said tail piece towards said distal end of said head of said tail piece such that transfer of drive forces from an associated drill are predominantly shifted to the body.

9. The assembly defined in claim 8, wherein said rod is formed of metal.

10. The assembly defined in claim 8, further including a second quick-release head and said rod is attached to said second quick-release head by fasteners and said rod is attached to said tail piece by fasteners.

11. The assembly defined in claim 8, wherein said body and said head of said tail piece are hexagonally-shaped and said flute of said tail piece is circularly-shaped.

12. The assembly defined in claim 8, wherein said head of said tail piece has a length that is shorter than a length of said body of said tail piece.

13. The assembly defined in claim 8, further including a drill bit mounted to said first-defined quick-release head and a drill mounted to said tail piece.

14. The assembly defined in claim 8, wherein a clearance space is provided between said proximal end of said head of said tail piece and said wall of said quick-release head.

* * * * *